May 4, 1948.　　　A. B. WELTY　　　2,440,791

CORN HARVESTER

Filed Oct. 25, 1943

Inventor:
Albert B. Welty
By: Paul O. Pippel

Patented May 4, 1948

2,440,791

UNITED STATES PATENT OFFICE 2,440,791

CORN HARVESTER

Albert B. Welty, Moline, Ill., assignor to International Harvester Company, a corporation of New Jersey Application October 25, 1943, Serial No. 507,515

3 Claims. (Cl. 56—18)

The invention relates to a corn harvester, particularly of the ear-snapping type.

These machines usually embody a suitable framework in which is provided a corn-stalk throat or passageway in which is disposed a longitudinal pair of oppositely rotating snapping rolls between which the corn stalks pass as the machine advances along the field. The purpose of this invention is to provide operative means associated with these snapping rolls to facilitate the handling of stalks and ears and improve the operation of snapping the ears from the stalk.

The main object of this invention is to provide an improved corn harvester, and, more particularly, the object is to provide an improved mechanism for snapping ears from corn stalks.

Another object is to provide such means in a simple, inexpensive form applicable to standard corn harvesters to improve their operation.

Other objects will become apparent to those versed in this art as the disclosure is more fully made.

These objects may be achieved by the example of the invention selected for purposes of this disclosure, in which there is disposed above the pair of snapping rolls a helical member which may be on an axis parallel with the axis of the snapping rolls, said helical member being rotatably driven and having a portion of short pitch length to serve as a stalk and ear conveyor, and also a portion of much longer pitch to serve as a beating portion which will snap or bat ears off stalks and knock them in a direction to be received by an ear-forwarding conveyor running alongside the snapping rolls.

Figure 2:
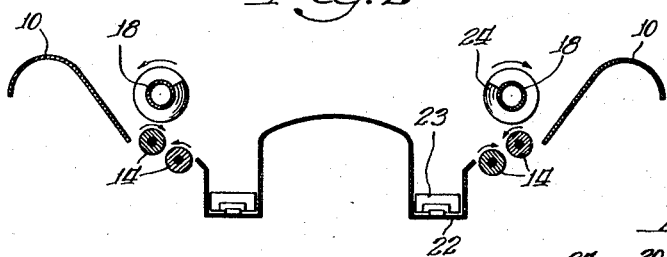
Figure 2 is a cross-sectional view taken along the line 2—2 of Figure 1 looking in the direction of the arrows.
Figure 3:
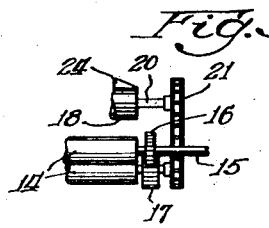
Figure 3 is a detail view showing a driving arrangement for the snapping rolls and helical member shown on the right-hand side in Figure 2.

The invention is useful with either a one or two row corn harvester. A 2-row corn harvester is shown, the same embodying a suitable framework 10 in which are provided throat portions or stalk passageways 11 spaced apart in conformity with the row spacing of standing stalks of corn growing in a field. A central divider portion 12 is arranged on the front end of the framework, and opposite dividers, or gathering points, 13 are likewise provided in the usual way so that the member 12 cooperates with the respective members 13 to deflect the stalks into the passageway 11, within which passageway 11 is disposed a conventional pair of snapping rolls 14, the same being longitudinally disposed and in the usual way being inclined upwardly and rearwardly, said rolls being driven in opposite directions toward one another, as indicated by the arrows in Figure 2, by means of a drive shaft 15 on which is a spur gear 16 on one roller, said spur gear 16 in turn meshing a gear 17 on the other snapping roll, all as shown in Figure 3.

Each set of rolls 14 in each throat 11 has supported thereabove a helical member in the form of a roller 18. The roller 18 has its front end suitably mounted in a bracket 19 supported on the framework 10, as shown. The rear end of the roller can be supported in any suitable manner on a shaft 20 driven by a sprocket chain 21 from the shaft which drives one of the rollers 14, as appears in Figure 3. The arrangement is such that the rollers are driven in the direction indicated by the arrows in Figure 2, with the rollers 18 being turned in a direction toward the longitudinal center line of the corn harvester and in the direction of a longitudinal conveyor trough 22 formed in the framework 10 below and adjacent the snapping rollers 14. In each conveyor trough 22 is arranged an ear-forwarding conveyor chain 23 running rearwardly to remove ears from the corn harvester in the usual way.

Figure 1:
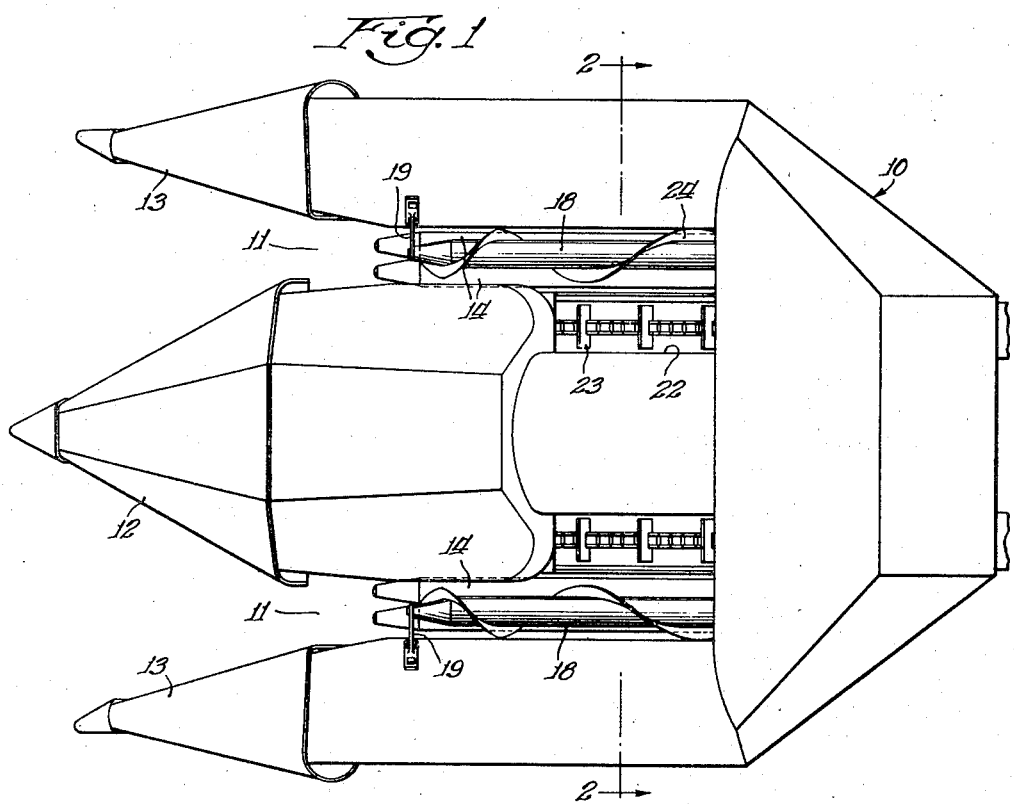
Figure 1 is a general plan view of a two-row corn harvester incorporating the inventive features of this application.

The roller 18 is provided with a spiral flight conformation 24 which, as clearly shown in Figure 1, at its front end is of relatively short pitch length whereas the rear portion of said flight conformation is of relatively long pitch length. The short pitch length section is disposed over the front ends of the snapping rolls and ahead of the forward ends of the ear-forwarding conveyors 23 so that said short length pitch flight conformation acts as a stalk and ear-forwarding conveyor. The rear flight section on each roller 18 is of much longer pitch and is disposed adjacent the ear-forwarding conveyors 23 so that each long pitch flight portion acts as a beater to snap ears from stalks and to bat severed ears in a direction toward the ear-forwarding conveyor so that the latter may receive such ears.

In operation, it will be apparent that as the corn harvester is propelled through the field, the stalks, all of which remain standing, will pass through the throat 11 and be drawn downwardly between the oppositely rotating snapping rolls 14, as is usual in corn snappers, to snap ears from the stalks, some of which will drop into the trough 22 to be moved out of the corn harvester by the ear-forwarding conveyor 23. The combination conveyor and beater spiral member 18, disposed above the snapping rolls, acts at its front end to convey broken-off stalks and ears toward the conveyor 23, while the rear flight portion of relatively long pitch will act as a beater to beat unsevered ears from the standing stalks and to bat them in the direction of the conveyor 23 and directly thereonto, the lateral offset inclination of the snapping rolls 14 also causing severed ears to gravitate to the conveyor 23, which is at a lower level than the level of the lower snapping roll as shown in Figure 2.

It can now be seen that this structure achieves the objects heretofore recited. It is the intention herein to cover all such changes and modifications of the preferred example disclosed which do not depart from the spirit and scope of the invention as it is defined in the appended claims.

What is claimed is:

1. In a corn harvester, a framework providing a longitudinal stalk throat, a pair of longitudinal snapping rolls cooperably positioned and laterally inclined in offset position at different levels in said throat to receive stalks therebetween to snap corn ears therefrom, a longitudinal earforwarding conveyor positioned in a trough formed alongside of and at a level below the lower of the snapping rolls to receive snapped ears therefrom, and a generally longitudinal roll positioned above said snapping rolls, said roll having a continuous spiral flight formed thereon of variable pitch portions, and means turning said roll in a direction toward the ear-forwarding conveyor so that one portion of the spiral flight acts to convey stalks and ears in the direction of discharge while another portion of the spiral flight acts to beat ears from the stalks and bat them directly onto the ear-forwarding conveyor.

2. In a corn harvester, a framework providing a longitudinal stalk throat, a pair of longitudinal snapping rolls cooperably positioned and laterally inclined in offset position at different levels in said throat to receive stalks therebetween to snap corn ears therefrom, a longitudinal earforwarding conveyor positioned in a trough formed alongside of and at a level below the lower of the snapping rolls to receive snapped ears therefrom, and a roll positioned above said snapping rolls, said roll having spiral flight conformations thereon, one conformation being relatively small in pitch to serve as a stalk and ear conveyor and another conformation being of considerably greater pitch to serve as a beater to knock ears from the stalks, and means to rotate the said roll toward the earforwarding conveyor directly to deliver the ears onto said conveyor.

3. In a corn harvester, a framework providing a longitudinal stalk throat, a pair of longitudinal snapping rolls cooperably positioned and laterally inclined in offset position at different levels in said throat to receive stalks therebetween to snap corn ears therefrom, a longitudinal ear-forwarding conveyor positioned in a trough formed alongside of and at a level below the lower of the snapping rolls to receive snapped ears therefrom, and a roll positioned above said snapping rolls, said roll having a spiral flight conformation at its forward end of small pitch to act as an ear and stalk conveyor, said roll extending a distance forwardly of the forward end of the ear-forwarding conveyor, a spiral flight conformation on said roll at its rearward end of much greater pitch to act as a beater to snap ears from stalks, said latter flight conformation being disposed alongside the ear-forwarding conveyor, and means to rotate the said roll toward the ear-forwarding conveyor directly to deliver the ears onto said conveyor.

ALBERT B. WELTY.

REFERENCES CITED

The following references are of record in the file of this patent:

UNITED STATES PATENTS

| Number | Name | Date |
|---|---|---|
| 519,929 | Schurkens | May 15, 1894 |
| 890,648 | Hibbs | June 16, 1908 |
| 1,046,335 | Rust | Dec. 3, 1912 |